(12) United States Patent
May et al.

(10) Patent No.: US 6,979,041 B2
(45) Date of Patent: Dec. 27, 2005

(54) MOLDING FOR A GLASS PANE

(75) Inventors: Frederick May, Potomac, MD (US);
Gennadiy Mesh, Sterling, VA (US)

(73) Assignee: REHAU Incorporated, Leesburg, VA (US)

( * ) Notice: Subject to any disclaimer, the term of this patent is extended or adjusted under 35 U.S.C. 154(b) by 0 days.

(21) Appl. No.: 10/753,462

(22) Filed: Jan. 9, 2004

(65) Prior Publication Data
US 2005/0151389 A1 Jul. 14, 2005

(51) Int. Cl.[7] .............................. B60J 1/02
(52) U.S. Cl. .............. 296/93; 52/208; 52/204.597
(58) Field of Search .............. 296/93, 201, 146.15; 52/208, 204.597

(56) References Cited

U.S. PATENT DOCUMENTS

| | | | |
|---|---|---|---|
| 3,774,363 A * | 11/1973 | Kent .................. | 52/204.597 |
| 3,783,568 A * | 1/1974 | Adler et al. ........... | 52/204.597 |
| 3,851,432 A * | 12/1974 | Griffin ................ | 52/204.597 |
| 4,347,693 A * | 9/1982 | Kruschwitz ........... | 52/208 |
| 4,358,917 A * | 11/1982 | Oda et al. ............ | 296/93 |
| 4,483,113 A * | 11/1984 | Kruschwitz ........... | 52/208 |
| 4,488,753 A * | 12/1984 | Koike ................. | 296/201 |
| 4,502,259 A * | 3/1985 | Smith ................. | 52/208 |
| 4,562,676 A * | 1/1986 | Kruschwitz ........... | 52/208 |
| 4,621,469 A * | 11/1986 | Kruschwitz ........... | 52/208 |
| 4,627,145 A * | 12/1986 | Niemanns ............. | 52/204.597 |
| 4,765,673 A * | 8/1988 | Frabotta et al. ....... | 296/93 |
| 4,833,847 A * | 5/1989 | Inayama et al. ....... | 296/93 |
| 4,905,432 A * | 3/1990 | Romie ................ | 296/93 |
| 5,001,876 A * | 3/1991 | Harper et al. ........ | 296/93 |
| 5,009,462 A * | 4/1991 | Katcherian ........... | 296/93 |
| 5,039,157 A * | 8/1991 | Yada ................. | 296/93 |
| 5,078,444 A * | 1/1992 | Shirahata et al. ..... | 296/93 |
| 5,088,787 A * | 2/1992 | Gross ................ | 296/93 |
| 5,118,157 A * | 6/1992 | Tamura ............... | 296/93 |
| 5,133,537 A * | 7/1992 | Shirahata et al. ..... | 296/93 |
| 5,190,338 A * | 3/1993 | Yada ................. | 296/93 |
| 5,193,875 A * | 3/1993 | Tamura ............... | 296/93 |
| 5,257,450 A * | 11/1993 | Tamura ............... | 29/527.1 |
| 5,311,711 A * | 5/1994 | Desir, Sr. ............ | 296/93 |
| 5,441,688 A * | 8/1995 | Goto et al. ........... | 264/167 |
| 5,480,207 A * | 1/1996 | Gold ................. | 296/93 |
| 5,480,504 A * | 1/1996 | Gold ................. | 296/93 |
| 5,618,079 A * | 4/1997 | Yukihiko et al. ...... | 296/93 |
| 5,624,148 A * | 4/1997 | Young et al. ......... | 296/93 |
| 5,837,297 A * | 11/1998 | Yada et al. .......... | 425/381 |
| 6,409,244 B1 * | 6/2002 | Nagahashi et al. .... | 296/93 |
| 6,748,706 B2 * | 6/2004 | Gaiser et al. ........ | 52/208 |
| 6,826,883 B2 * | 12/2004 | Guzman et al. ....... | 296/83 |
| 2003/0200717 A1 * | 10/2003 | Guzman et al. ....... | 296/93 |
| 2005/0006922 A1 * | 1/2005 | Mikkaichi et al. ..... | 296/93 |

* cited by examiner

Primary Examiner—Kiran B. Patel
(74) Attorney, Agent, or Firm—McGuireWoods LLP

(57) ABSTRACT

A molding for a window or windshield is described. The molding includes a channel for engaging a window or windshield. The molding includes a window or windshield contact portion that forms a portion of the channel and is made from a material having a greater elasticity than other parts of the molding. The molding reduces or eliminates visual flaws that may be encountered when a window or windshield is installed in an opening of a structure exposed to varying environmental conditions.

16 Claims, 1 Drawing Sheet

MOLDING FOR A GLASS PANE

FIELD OF THE INVENTION

The present invention is directed to a molding used to surround the perimeter of a glass pane. Of particular applicability is a molding that is used around a windshield for an automobile.

BACKGROUND OF THE INVENTION

A windshield is held in place on the automobile by adhering an interior portion of the windshield to a surface of the automobile. Typically the windshield opening of the automobile includes an edge or lip that is adapted to receive the windshield. An adhesive, such as a urethane adhesive, is used to secure the windshield to the lip or edge of windshield opening. To improve the bonding between the windshield and the adhesive, a primer is coated around the interior portion of the windshield that will contact the adhesive. To reduce the gap between the windshield and the body of the automobile, the perimeter of the windshield is typically surrounded by a molding. The molding is typically flexible allowing the molding to form around the perimeter of the windshield and compensate for variations in the windshield size relative to the automobile opening. In some instances, the molding may help to prevent wind and water from entering the interior cabin of the automobile. After the installation of the windshield in the automobile and after a passage of time, visible flaws are prone to appear around the perimeter of the windshield near the installed molding.

SUMMARY OF THE INVENTION

The invention is directed to a molding that addresses the above mentioned problems. Accordingly, the present invention is directed to a molding for a window that includes an exterior surface member, an interior seating member spaced from and opposing the exterior surface member, a channel formed between the exterior surface member and the interior seating member, and a window contact member on the interior seating member, wherein the window contact member forms at least a portion of a wall of the channel, and wherein the window contact member has an elasticity greater than the elasticity of the interior seating member.

The invention also includes a molding for the windshield of an automobile, where the molding includes an exterior surface member, an interior seating member spaced from and opposing the exterior surface member, a channel formed between the exterior surface member and the interior seating member, and a windshield contact member on the interior seating member, wherein the windshield contact member forms at least a portion of a wall of the channel extending from the opening of the channel into the channel, and wherein the windshield contact member has an elasticity greater than the elasticity of the interior seating member.

DETAILED DESCRIPTION OF EMBODIMENTS OF THE INVENTION

The invention is directed to a molding that reduces or eliminates the visual flaws that may occur around the perimeter of the windshield. As discussed above, during the installation of a windshield in an automobile, to improve the bonding between the windshield and the adhesive, a primer is coated around the interior portion of the windshield that will contact the adhesive. Because a molding is installed around the perimeter of the windshield and is in close proximity to the applied primer, a certain amount of primer is prone to contact and seep into the channel of the molding holding the windshield. Without intending to be bound by theory, it is believed that the visual flaws are due in part to the primer coming in contact with the molding and bonding a portion of the molding to the windshield. As environmental conditions change, the molding expands and contracts placing stress on the bonded molding and glass interface. As the molding pulls away from the windshield, small portions of the windshield may break away, thus producing visual flaws around the perimeter of the windshield.

The invention is directed to a molding that resists or eliminates the formation of visual flaws around the perimeter of the windshield. While the invention is described with respect to a windshield of an automobile, the invention may be used for a windshield or window and the frame opening in an automobile or other types of vehicles or structures.

Figure 1:
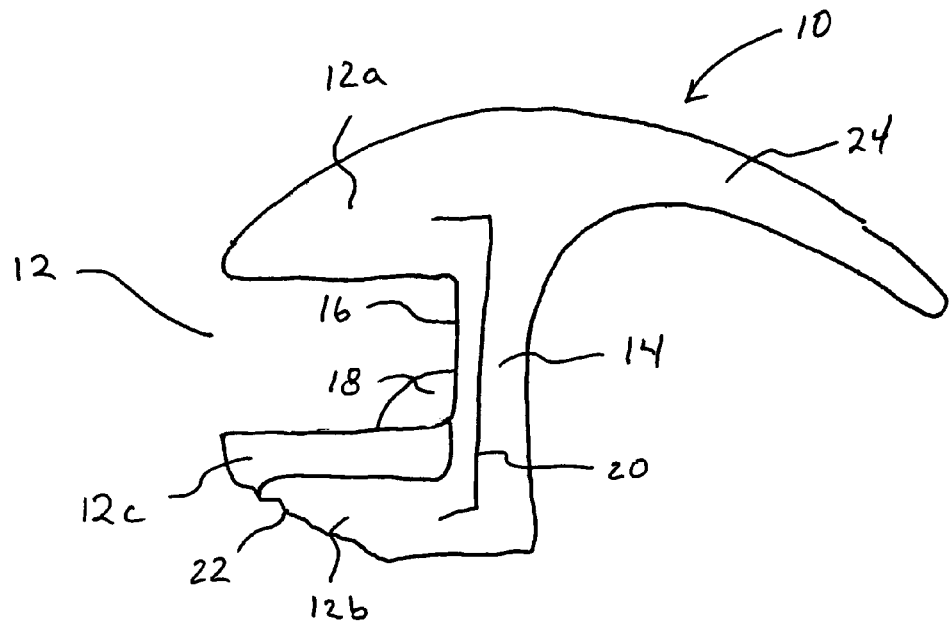
FIG. 1 is a cross-sectional view of a molding in accordance with an embodiment of the invention.

With reference now to FIG. 1, a molding of the invention generally depicted as reference numeral 10 is shown. The molding 10 is preferably made from an ultraviolet stable, weatherable elastomeric material or combination of materials that has good cold flexibility and compression set. Preferably, the material is also squeak resistant. Preferably, the molding is made of unitary construction; though, different materials having different properties may be used in different portions of the molding depending on the desired features of the flexible molding 10, as discussed below. The molding 10 may also be continuously coextruded or tri-extruded using techniques known to those skilled in the art.

The molding 10 includes a channel 12 formed by opposing, extending members 12a, 12b. The extending member 12a is defined for purposes of clarity as an exterior surface member and the member 12b is an interior seating member. The channel 12 further includes a bridge section 14 having a wall 16 extending between the opposing exterior surface member 12a and the interior seating member 12b. The interior seating member 12b includes a windshield contact member 12c that is designed to rest against an interior surface of the automobile windshield opening. The windshield contact member 12c preferably covers the surfaces of the interior seating member 12b that may come in contact the primer when the windshield is inserted into the channel 12. Preferably the windshield contact member 12c begins at the opening of the channel 12 and extends a distance into the channel. In some embodiments, the windshield contact member extends to the depth of the channel 12 to the wall 16. The windshield contact member 12c preferably covers other surfaces of the interior seating member 12b near the opening of the channel 12 that may contact the primer and the windshield.

The windshield contact member 12c is preferably formed of an elastomeric material having an elasticity greater than that of the rest of the molding. The windshield contact member 12c may be formed from any elastomeric material that exhibits sufficient elasticity to stretch with changing environmental conditions and not break away portions of the windshield. Preferably, the material for the windshield contact member 12c has an elasticity and strength that will allow portions of the windshield contact member 12c to break rather than small portions of the windshield. The windshield contact member 12c may be formed from materials including, but not limited to, Rimtech™, Rau Pren™, Santoprene®, Alcryn® (E.I. Du Pont de Nemours and Company), flexible PVC, or other similarly flexible materials. Rau Pren™ may include Rau Pren 707™. The windshield contact member 12c is more flexible than the material forming the channel 12 such. The windshield contact member 12c may be coextruded with the rest of the molding by techniques known to those skilled in the art. Materials for forming the channel 12, interior seating member 12b and exterior surface member 12a may include, but are not limited to, relatively rigid materials such as polyethylene, polypropylene, PVC 1650, ABS, or other similar materials.

The interior seating member 12b may be secured to the automobile by using an adhesive such as a urethane adhesive. In embodiments, the interior seating member 12b may include one or more ridges 22 in order to increase a surface area thereof for the adhesive to promote a more secure installation of the windshield.

An adhesive 18 may be placed in the channel 12 and, in certain embodiments, the adhesive 18 contacts a portion of the windshield contact member 12c. Any adhesive that promotes a bond between the edge of the windshield and the molding may be used with the present invention such as, for example, butyl adhesives.

The exterior surface member 12a includes an exterior surface lip 24. The exterior surface lip 24 extends from the exterior surface member 12a and is substantially aligned therewith. The exterior surface lip 24 is provided to accommodate differences in the size of the windshield and the opening of the automobile. The exterior surface lip 24 may be made from flexible squeak resistant material that may be coextruded or tri-extruded with the other portions of the molding and may be made from materials similar to those used for the windshield contact member 12c. The exterior surface lip 24 may have a curvature curving downwards towards the interior seating member 12b. The curvature of the exterior surface can take on a variety of configurations and may even be flat. In still further embodiments, an exterior surface of the exterior surface member 12a and exterior surface lip 24 may create a continuous exterior curved surface. The bridging section 14 extends between the channel opening tab interior seating member 12b and the exterior surface lip 24.

Still referring to FIG. 1, a molding reinforcement 20 may be embedded in the wall section 14; however, it should be understood by those of ordinary skill in the art that the molding reinforcement 20 may take on a variety of configurations. In FIG. 1, the molding reinforcement 20 is shown as having a U-shaped cross-section, but may also have a linear or L-shaped cross-section. The molding reinforcement 20 is typically made of a relatively ridged material that can be formed around the perimeter of the windshield. The material for the molding reinforcement may include, but is not limited to, aluminum, brass wire, nylone wire, steel, and metal alloys.

The molding 10 of the present invention may be manufactured in varying and different sizes and dimensions depending on the application. For example, the molding may be manufactured with differing channel widths to accommodate windshields that have different thickness. The flexible molding may also be continuously extruded using techniques known to those skilled in the art. However the adhesive 18 is typically applied in the channel in a second step after extrusion of the flexible molding.

The flexible molding 10 may be also provided in fixed lengths for specific applications or in bulk. The flexible molding 10 may be manufactured in varying sizes depending on the application without departing from the scope of the invention.

Figure 2:
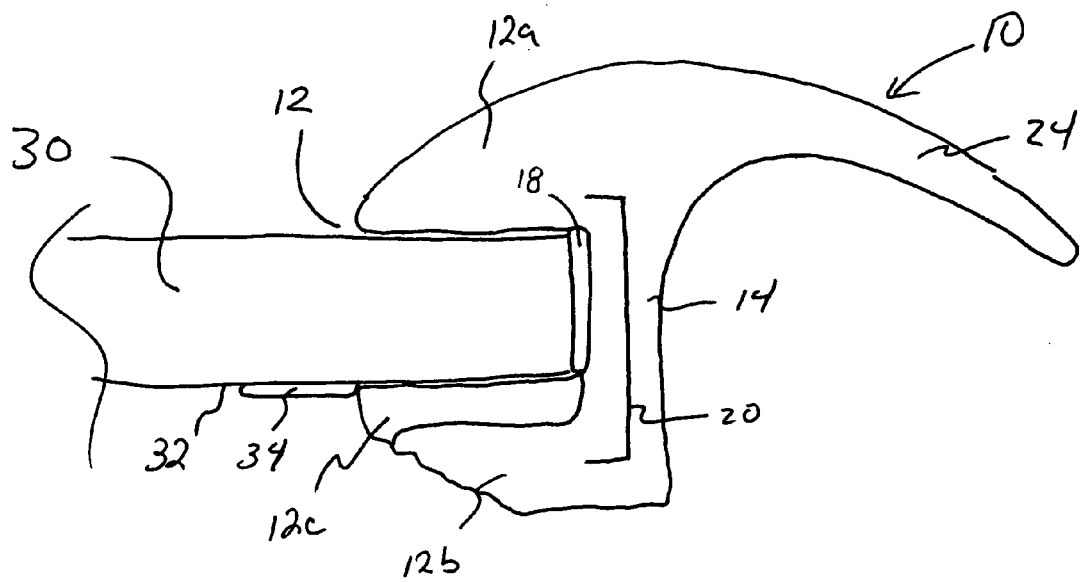
FIG. 2 is a cross-sectional view of a molding in accordance with an embodiment of the invention installed on a windshield.

With reference now to FIG. 2, there is shown a molding 10 in accordance with the present invention installed on the edge of a windshield 30. During the installation of a windshield in an automobile, the interior portion of the windshield 32 that will be adhered to the automobile is coated with a primer 34. The molding 10 is installed around the perimeter of the windshield by engaging the edge of the windshield 30 in the channel 12. Primer 34 near the edge of the windshield contacts the windshield contact member 12c. Bonding of the molding 10 to the windshield 30 as a result of the primer will occur predominately between the windshield contact member 12c and the windshield 30. The windshield would be placed in the opening of the automobile and secured with a adhesive. As the molding and windshield are exposed to environmental conditions, the window contact member 12c will stretch to accommodate the stress created between the portion of the windshield bonded to the molding and the molding. If the created stress exceeds the elasticity of the window contact member 12c, a portion of the window contact member 12c will break down prior to small portions of the windshield breaking down.

The present invention has been described in relation to its preferred embodiment, it is to be understood that this disclosure is illustrative and exemplary of the invention and is made for providing a full and enabling disclosure of the invention. The foregoing disclosure is not intended to be construed to limit the invention or otherwise exclude any other embodiments, adaptations, variations, modifications or equivalent arrangements, the invention being limited only by the claims and the equivalents thereof.

What is claimed is:

1. A molding for a window, comprising:
    an exterior surface member;
    an interior seating member spaced from and opposing said exterior surface member;
    a channel formed between said exterior surface member and said interior seating member; and
    a window contact member on the interior seating member, wherein the window contact member forms at least a portion of a wall of the channel, and wherein the window contact member has an elasticity and strength so that the window contact member breaks at a lower stress than a window bonded thereto.

2. The molding of claim 1 wherein the window contact member is made from a melt-processable polymeric compound selected from the group consisting of Rau Pren™, Santoprene®, Alcryn®, and flexible polyvinyl-chloride (PVC).

3. The molding of claim 1 further comprising a molding reinforcement embedded in said molding between the exterior surface member and the interior surface member.

4. The molding of claim 1 further comprising a plurality of primer ridges located on said interior seating member for providing additional surface area for an adhesive.

5. The molding of claim 1 wherein the window contact member forms a wall of said channel that contacts an interior surface of a window.

6. The molding of claim 1, in combination with a window having an edge adhesively fixed within said channel.

7. The molding of claim 1, further comprising an exterior surface lip extending from said exterior surface member.

8. The molding of claim 1 wherein the interior seating member is selected from the group consisting of polyethylene, polypropylene, rigid polyvinyl=chloride (PVC), and acrylonitrille-butadiene-styrene (ABS).

9. A molding for the windshield of an automobile, the molding comprising:
   an exterior surface member;
   an interior seating member spaced from and opposing said exterior surface member;
   a channel formed between said exterior surface member and said interior seating member; and
   a windshield contact member on the interior seating member, wherein the windshield contact member forms at least a portion of a wall of the channel extending from the opening of the channel into the channel, and wherein the windshield contact member has an elasticity and strength so that the windshield contact member breaks at a lower stress than a windshield bonded thereto.

10. The molding of claim 9 wherein the window contact member is made from a melt-processable polymeric compound selected from the group consisting of Rau Pren™, Santoprene®, Alcryn®, and flexible polyvinyl-chloride (PVC).

11. The molding of claim 9 further comprising a molding reinforcement embedded in said molding between the exterior surface member and the interior surface member.

12. The molding of claim 9 further comprises a plurality of primer ridges located on said interior seating member for providing additional surface area for an adhesive.

13. The molding of claim 9 wherein the windshield contact member forms a wall of said channel that contacts an interior surface of a windshield.

14. The molding of claim 9 further comprising a an exterior surface lip extending from said exterior surface member.

15. The molding of claim 9 wherein the interior seating member is selected from the group consisting of polyethylene, polypropylene, PVC 1650, and ABS.

16. The molding of claim 9, in combination with a windshield having an edge adhesively fixed within said channel.

* * * * *